United States Patent [19]
Wallace

[11] Patent Number: 5,503,363
[45] Date of Patent: Apr. 2, 1996

[54] VARIABLE ORIFICE VALVE

[76] Inventor: Glenn E. Wallace, 2063 S. Della La., Anaheim, Calif. 92802

[21] Appl. No.: 238,956

[22] Filed: May 6, 1994

[51] Int. Cl.⁶ .......................... F16K 31/122; F16K 47/00
[52] U.S. Cl. .................. 251/62; 138/45; 251/63; 251/122; 405/52
[58] Field of Search .................. 251/62, 63, 120, 251/121, 122; 138/45, 46; 166/320; 405/36, 52

[56] References Cited

U.S. PATENT DOCUMENTS

| | | | |
|---|---|---|---|
| 2,654,395 | 10/1953 | Kaye | 251/122 |
| 3,220,693 | 11/1965 | Dickson | 251/122 |
| 3,679,169 | 7/1972 | Bedo et al. | 251/122 |
| 3,761,053 | 9/1973 | Bedo et al. | 251/122 |
| 4,047,695 | 9/1977 | Cleveland et al. | 138/46 |
| 4,114,851 | 9/1978 | Shivak et al. | 251/122 |
| 4,280,569 | 7/1981 | Mount, II | 251/63 |
| 4,377,177 | 3/1983 | Claycomb | 251/122 |

FOREIGN PATENT DOCUMENTS 282823  3/1952  Switzerland ............................ 251/63

*Primary Examiner*—George L. Walton

[57] ABSTRACT

The Variable Orifice Valve is disclosed and the preferred embodiment of a hydraulically actuated device that permits the calibrated throttling of water used in an Aquifer Storage and Recovery (ASR). ASR is the storage of treated drinking water in an aquifer during periods of surplus water for recovery during peak demands. This device is installed below the static water level and at or near the bottom of the column pipe in the recharge well. The size of the orifice and the flow of water is varied by the axial adjustment of a hydraulic piston. The axial position of the piston is controlled by a hydraulic actuator competed through steel tubing to a hydraulic pump at the well head. The flow is monitored by using a flow meter and pressure gage in the hydraulic fluid passageway. The desired flow is set by adjusting the Variable Orifice Valve hydraulically while monitoring the flow. The operator may adjust the flow of water to any increment within the range of the valve.

3 Claims, 2 Drawing Sheets

VARIABLE ORIFICE VALVE

BACKGROUND-FIELD OF INVENTION

This disclosure relates to Aquifer Storage and Recovery (ASR) of water beating aquifers and flow control devices used in optimizing the rate of recharge.

BACKGROUND OF INVENTION

This invention is the result of the determination that an Artificial Recharge Well used in the Acquifer Storage and Recovery (ASR) in the storage of drinking water can and will require injection rate to be varied during the well's life span to allow optimization of the well's potential under changing background conditions.

In the arid western portions of the United States the natural recharge rates are falling behind the production rates, the result is the gradual lowering of the static water levels in the aquifers. An aquifer is natures version of a water reservoir. Artificial Recharge of aquifers is an activity that is an acceptable means of replacing the water stored in an aquifer and restores the static water levels. An Artificial Recharge Well is essentially a production well used in reverse or a means of refilling the aquifer. Artificial recharge of ground water aquifers is also done to bank or store extra water for summer months when peak demands are greater than the surface water infrastructure can supply. Typically, in this situation, the summer or production season is 3–4 months long and the recharge season is for the remainder of the year.

The recharge rate of an Artificial Recharge Well is normally controlled by a single size orifice plate that is designed for specific recharge rate. The orifice plate is installed at/or near the bottom of the injection piping and provides for flow control and a means to maintain the column pipe full of water, thus eliminating the potential of bacterial development and most or all of the air and bubbles formed by the free falling water. The free falling water aerates the groundwater and forms bubbles that are forced into the sands of the aquifer. The bubbles cling to the sand particles effectively increasing the size of each sand particle grain. This action effectively closes off the permeability of the aquifer and gradually reduces the amount of water that may be recharged. In some cases the well has been rendered useless. The recharge rate is determined at the time of drilling of the well and provides a starting point for the design recharge rate. In most cases the recharge rate will eventually need to be increased or decreased to optimize the injection rate and period to maximize the volume of water stored. To change the recharge rate in a typical recharge well it is necessary to pull the column pipe and change the orifice plate. This is an expensive process costing $10,000 to $12,000 ('94$) and will take the well out of service. This disclosure reveals a devise that eliminates the need to pull and replace the orifice plate to obtain a different flow rate.

BRIEF DESCRIPTION OF THE INVENTION

The following is a more descriptive characterization of the preferred embodiment shown in FIG. 1.

This invention is a Variable Orifice Valve or Linear Hydraulic Flow Control Device that permits calibrated throttling or flow adjustments from the well head and eliminate the process of pulling the well column pipe to replace the orifice plate. The flow is adjusted by axially positioning a tapered piston or a tapered shaped restrictive valving portion in an orifice plate or circular opening. The axial position is determined by a hydraulic actuator at the valve. The actuator is connected through a steel tubing to a hydraulic pump at the well head. The desired flow is set or adjusted by monitoring a flow meter or flow monitoring means and hydraulically positioning the piston. To decrease the water flow the piston is hydraulically moved axially and vertically towards the orifice plate, therefor closing the valve. To increase the flow, hydraulic fluid is released from the actuator, repositioning the piston away from the orifice plate, causing the valve to open. Incremental adjustments of flow can be made within the entire range of the valve.

A linear hydraulic flow control device for determining a desired flow rate, comprising a hydraulic fluid passageway housing, an orifice plate having a circular opening therein is disposed within said fluid passageway housing and being secured thereto, a plurality of equally spaced guide mounting plates disposed within said passageway housing, said guide mounting plates having one end secured to the surface face of said mounting plate, a hydraulic piston control device disposed within said passageway housing and movably guided between said guide mounting plates, said control device having tapered portions disposed at each end of said control device and an intermediate circular portion therebetween, one of said ends having a tapered shaped restrictive valving portion an the intermediate portion having a circular valving portion for variably controlling a fluid flow rate through said circular opening by changing the size of said circular opening, as said tapered valving portion and said intermediate valving portion are moved through said circular opening, an adjustable hydraulic actuator is secured to the other of said tapered ends within said fluid passageway housing, said hydraulic actuator having a portion secured to the other ends of said guide mounting plates, said hydraulic actuator adjustable controls the movement of said control device valving portions relative to said circular opening to permit a desired flow rate, where by the movement of said control device through said guide mounting plates minimizes flow turbulence through said circular opening; and means for adjusting the hydraulic actuator for setting the desired flow rate to any increment within the range of the movement of said control device valving portions.

The linear hydraulic control device, as previously recited, in which the guide mounting plates serve as straightening vanes in the fluid passageway housing, said vanes act to stabilize the turbulent flow created by said control device valving portions and the circular opening during certain flow conditions.

The linear hydraulic flow device as previously recited, in which said hydraulic piston is adjusted by a volume of hydraulic fluid through a small diameter tube, a three way valve and any one of a manual pump and an electrically driven hydraulic pump, connected in series, and being cooperatively associated with said hydraulic actuator for determining the desired flow rate of said control device valving portions relative to said circular opening a flow monitoring means responsive to said flow rate within said fluid passageway housing.

DETAILED DESCRIPTION OF THE PREFERRED EMBODIMENT

Figure 1:
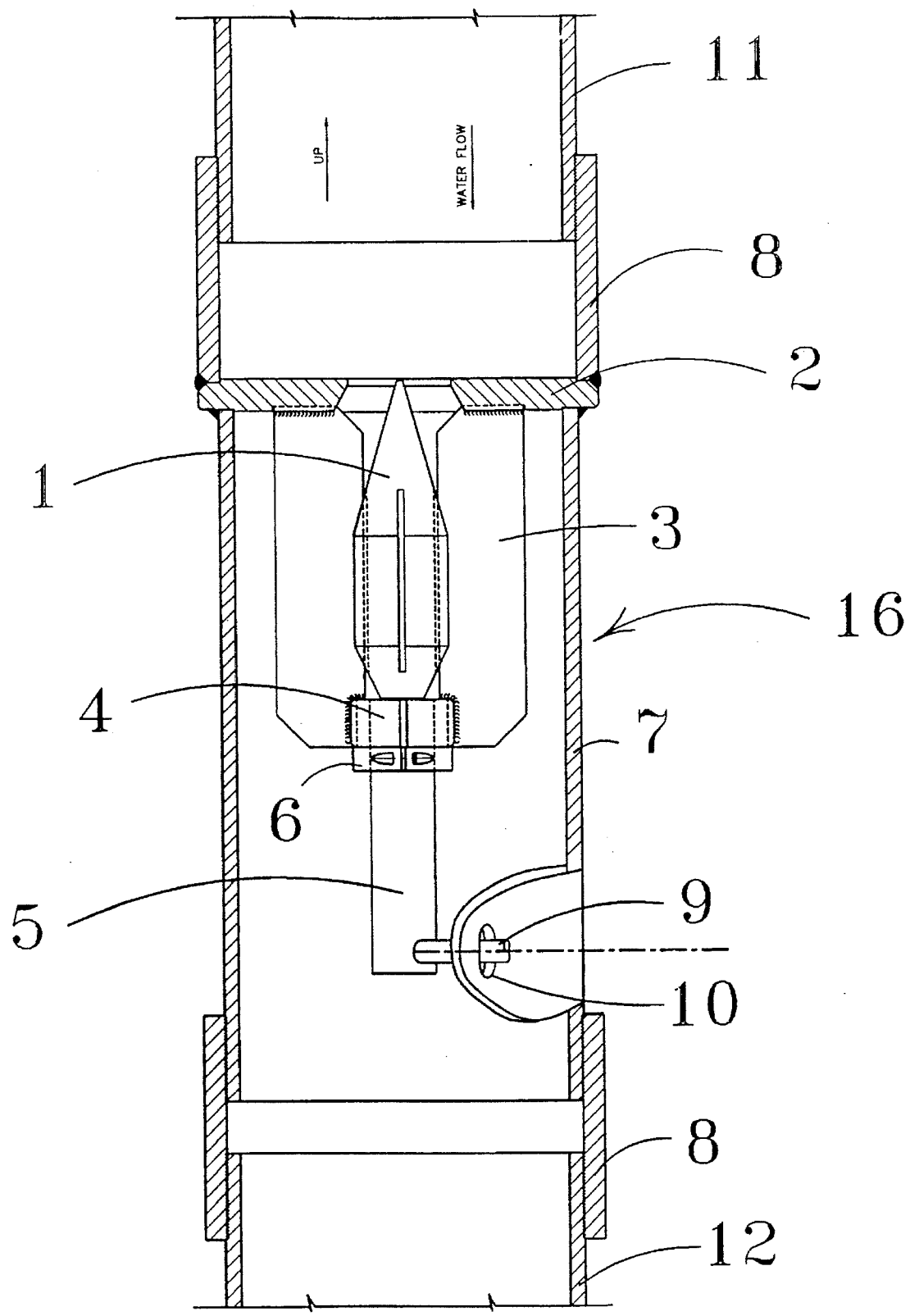
FIG. 1 a sectional view of the of the Variable Orifice Valve, with piston shown in the open position.
Figure 2:
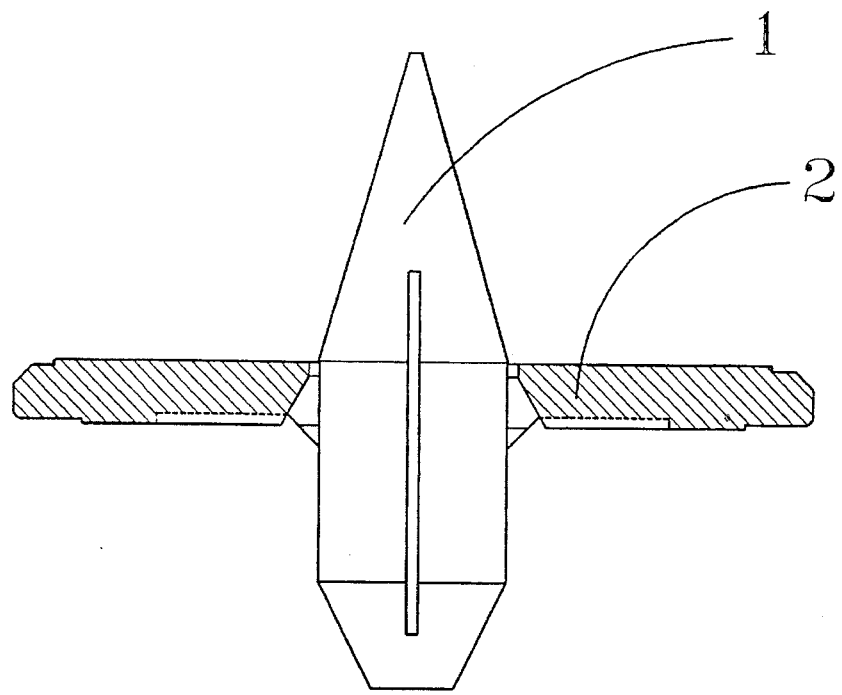
FIG. 2 is an enlarged sectional view and close up of the valve and the relationship of the piston and the orifice plate at the minimum flow condition or closed position.
Figure 3:
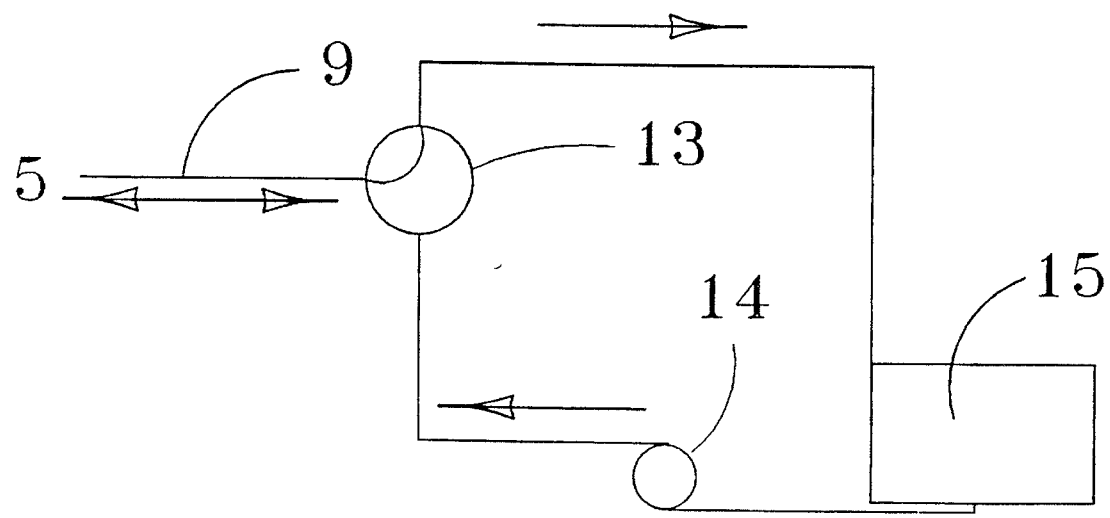
FIG. 3 is a schematic of the hydraulic control system used to set the flow rate of the Variable Orifice Valve.

Attention is first directed to FIG. 1, this illustrates the embodiment of this invention, A Variable Orifice Valve or Linear Hydraulic Flow Control Device, FIG. 3 schematic illustrates the hydraulic system used as a control apparatus. The Variable Orifice Valve is operated under hydraulic pressure. In the event of a loss of hydraulic fluid the valve will return to the open position or fail safe position. In the event of a loss of hydraulic fluid the hydraulic fluid is a bio-degradable glycol and potable, therefor is not an environmental hazard. The Variable Orifice Valve is generally identified by the number 16. To this end, the apparatus incorporates a fluid line 9 which delivers hydraulic fluid under pressure to the hydraulic actuator or slave cylinder 5 which moves the piston 1 towards the orifice plate 2 to reduce the flow through the valve. FIG. 2 shows the valve in the closed position. A unique feature of this valve is that the water flow is never shut off completely nor can the piston 1 be forced into the orifice plate 2, which would result in a catastrophic failure. This possibility, is a most likely scenario with an inexperienced operator or an individual who is not paying attention to what they are doing while adjusting the flow rate. The initial sizing of a valve provides a clearance between the piston 1 and the orifice plate 2. The valve is throttled or adjusted within the design range by observing a flow monitoring means or flow meter, a part of the normal water piping that supplies the well. The meter is used to totalize and record the flow of recharge water, a requirement by State Engineers in the west. The valve is individually sized and operate within a minimum design range, to 150% of maximum flow rate. The initial flow rate is determined by a hydrologist from aquifer test data acquired from the well at the time of drilling. To operate the Variable Orifice Valve and to decrease the flow valve 13 is closed and pump 14 is operated taking hydraulic fluid from the reservoir forcing hydraulic fluid through line 9 to the actuator 5, moving the piston I axially towards the orifice plate 2, reducing the size of the orifice plate 2 opening. To increase the flow through the Variable Orifice Valve 16, valve 13, FIG. 3 is opened, the hydraulic fluid returns through line 9 to the hydraulic storage tank 14 by the pressure of the hydraulic actuator 5 and the force of the flowing water flowing across the piston. Due to the wet environment that this valve operates in the piston 1, orifice plate 2, mounting plate 3, mounting bushing 4, hydraulic actuator 5 and locking collar 6 are made from a highly corrosion resistant steel. The threaded couplings 8 and the hydraulic fluid passageway 7 are steel items normally used in the column pipe of water wells.

I claim:

1. A linear hydraulic flow control device for determining a desired flow rate, comprising:

a) a hydraulic fluid passageway housing;

b) an orifice plate having a circular opening therein is disposed within said fluid passageway housing and being secured thereto;

c) a plurality of equally spaced guide mounting plates disposed within said passageway housing, said guide mounting plates having one end secured to the surface face of said mounting plate;

d) a hydraulic piston control device disposed within said passageway housing and movably guided between said guide mounting plates said control device having tapered portions disposed at each end of said control device and an intermediate circular portion therebetween, one of said ends having a tapered shaped restrictive valving portion an the intermediate portion having a circular valving portion for variably controlling a fluid flow rate through said circular opening by changing the size of said circular opening, as said tapered valving portion and said intermediate valving portion are moved through said circular opening;

d) an adjustable hydraulic actuator is secured to the other of said tapered ends within said fluid passageway housing, said hydraulic actuator having a portion secured to the other ends of said guide mounting plates, said hydraulic actuator adjustable controls the movement of said control device valving portions relative to said circular opening to permit a desired flow rate, where by the movement of said control device through said guide mounting plates minimizes flow turbulence through said circular opening; and e) means for adjusting the hydraulic actuator for setting the desired flow rate to any increment within the range of the movement of said control device valving portions.

2. The linear hydraulic control device, as recited in claim 1, in which the guide mounting plates serve as straightening vanes in the fluid passageway housing, said vanes act to stabilize the turbulent flow created by said control device valving portions and the circular opening during certain flow conditions, 3. The linear hydraulic flow device, as recited in claim 1, in which said hydraulic piston is adjusted by a volume of hydraulic fluid through a small diameter tube, a three way valve and any one of a manual pump and an electrically driven hydraulic pump, connected in series, and being cooperatively associated with said hydraulic actuator for determining the desired flow rate of said control device valving portions relative to said circular opening a flow monitoring means responsive to said flow rate within said fluid passageway housing.

\* \* \* \* \*